Nov. 17, 1925.
B. L. STITZINGER
JOURNAL BEARING
Filed Dec. 13, 1923
1,562,130
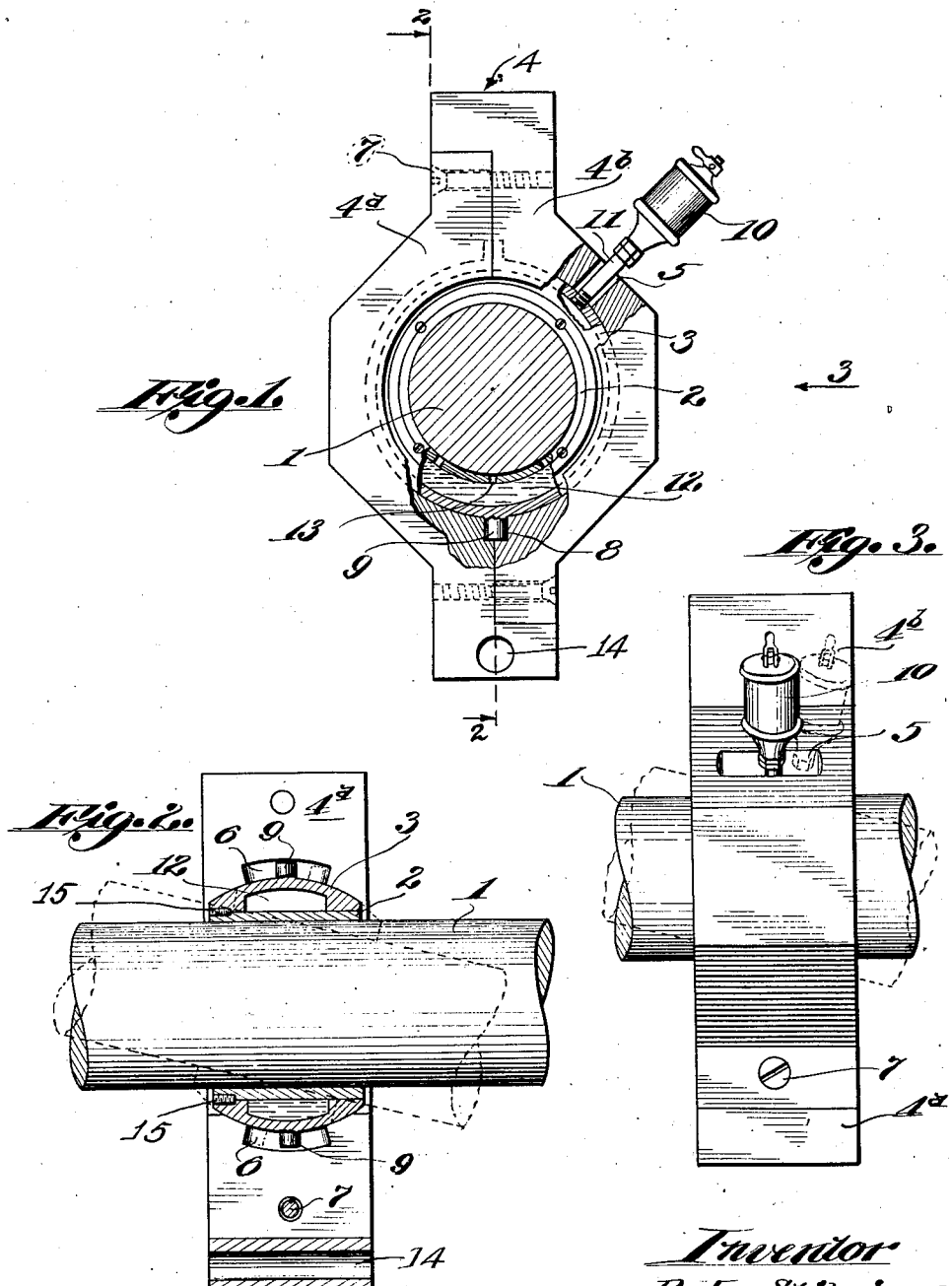
Inventor
B. L. Stitzinger
by Hazard and Miller
Att'ys Patented Nov. 17, 1925.

1,562,130

UNITED STATES PATENT OFFICE.

BRUCE L. STITZINGER, OF LONG BEACH, CALIFORNIA.

JOURNAL BEARING.

Application filed December 13, 1923. Serial No. 680,421.

*To all whom it may concern:*

Be it known that I, BRUCE L. STITZINGER, a citizen of the United States, residing at Long Beach, in the county of Los Angeles and State of California, have invented new and useful Improvements in Journal Bearings, of which the following is a specification.

My present invention being referred to as a journal bearing, it may be understood to be an object of this invention to provide means for the suitable support for a shaft, or the like; and it is an object of this invention to provide a journal bearing permitting variations in the inclination of a shaft relatively to the associated parts, such as a main supporting frame.

It is a further object of this invention to provide a journal bearing comprising a cylindrical sleeve adapted to surround a shaft, or the like, and rigidly connected or integral with a lubricating collar, one preferred embodiment of my invention comprising a ball-ground collar provided with oppositely-extending pins or projections, or their equivalent, adapted to prevent rotation of said collar with said shaft, the mentioned pins or projections being preferably received in arcuate slots formed in a manner hereinafter described.

It is a further object of this invention to provide a journal bearing comprising a ball-ground collar provided with a chamber to receive a lubricating oil, or its equivalent, lubricating oil being preferably fed to said chamber by means comprising an oil cup having a stem extending through an arcuate, or similar, slot, the lubricant so fed being delivered from the mentioned chamber by means comprising lubricating passages extending through the mentioned bearing sleeve; and, in a preferred embodiment of my invention, the ball-ground collar referred to may in turn be supported by a co-operating plate formed in two complemental parts whose interior concavity may adapt them to interfit with and retain the mentioned collar, although permitting a limited relative movement of the shaft extending therethrough in either a vertical or a horizontal plane, each of the complemental halves of the mentioned plate being preferably undivided at one end and there provided with means for securing the same to a main frame, or the like.

Other objects of my invention will appear from the following description of a preferred embodiment thereof, taken in connection with the appended claims and the accompanying drawings, in which—

Fig. 1 is a transverse section through a shaft provided with bearings of my improved design, parts being broken away.

Fig. 2 is a vertical section substantially on the line 2—2 of Fig. 1.

Fig. 3 is a side elevational view from the direction of the arrow 3 of Fig. 1.

Referring to the details of that specific embodiment of my invention chosen for purposes of illustration, this being an embodiment suitable for use in connection with said rail bearings such as are in current use in the drilling of oil wells, and the like, 1 may be a shaft extending transversely through a main frame and required to be capable of limited tilting movement, or angular displacement, relatively thereto; and 2 may be a substantially cylindrical bearing element within which the shaft 1 may be intended to have a rotary or reciprocatory, or both a rotary and reciprocatory movement.

In order to permit a tilting of the shaft 1, and the sleeve 2 therewith while holding the latter element against rotative movement, I prefer to employ a ball-ground collar 3, constituting one element of a universal or ball and socket connection the complemental or corresponding concave element being preferably in the form of a plate 4, shown as comprising two substantially identical interfitting half-plates 4$^a$ and 4$^b$, one of these plates being, however, preferably provided with an arcuate aperture or slot 5, for a purpose hereinafter referred to, and each of said half-plates being preferably cut away at 6 in such manner that when two such half-plates shall be secured together, as by means of machine screws 7, suitable grooves 8 shall be provided for the retention of the pins 9, having a limited movement in, for example, a vertical plane, the cutting at 6 being such as to form arcuate slots.

As a means for preventing the bearing element 2 from rotating within the collar 3, a plurality of set screws 15 are set between the contiguous surfaces of the element 2 and collar 3 and serve as keys, as shown in Fig. 2.

In order to provide lubrication for a journal bearing of the character described, any suitable means may be provided, and my preferred means for this purpose may comprise an oil cup 10 having a stem 11 extending through the mentioned slot 5 and threaded into the ball-ground collar 3, this collar being provided with a chamber 12, into which oil may be delivered by the means described, or by equivalent means, co-operating passages 13, or their equivalent, being shown as provided to permit a flow of oil from the chamber 12, through the cylindrical sleeve 2 into a direct contact with the shaft 1. In order to secure the undivided ends of plate 4 to a main frame, or the like, any suitable means, such as the aperatures 14, may be provided, these aperatures being shown as extending substantially parallel with the shaft 1.

Although I have herein described one complete embodiment of my invention, it should be understood that various features thereof might be independently employed, and also that various modifications might be made therein, without a departure from the spirit and scope of my invention as the same is indicated above and in the following claims. For example, it may be regarded as immaterial whether the sleeve 2 is formed integral with the ball-ground collar 3 or rigidly secured thereto, as by the screws 15 shown as extending parallel with the sleeve 2 and keying the mentioned parts together.

What I claim is:

1. A bearing for shafts and the like comprising a support formed of complemental halves, a ball ground collar disposed within said support and providing a bearing for the shaft, recesses formed in the opposed surfaces of said halves cooperating to form a slot, and a pin provided upon said collar and extending into said slot so as to be movable therein, whereby said shaft and collar are capable of universal movement within said support but rotation of said collar with said shaft is prevented.

2. A bearing for shafts and the like comprising a support formed of complemental halves, a ball ground collar disposed within said support and providing a bearing for the shaft, recesses formed in the opposed surfaces of said halves cooperating to form slots, and pins provided upon said collar and extending into said slots so as to be movable therein, whereby said shaft and collar are capable of universal movement within said support but rotation of said collar with said shaft is prevented.

3. A bearing for shafts and the like comprising a support formed of complemental halves, a ball ground collar disposed between said halves so as to be capable of universal movement therein, a sleeve of bearing metal secured in said collar forming a bearing for the shaft, a reservoir for a lubricant formed in said collar about said sleeve, said sleeve being provided with oil holes communicating with said reservoir, and means including a pin and slot connection for connecting said collar to said support, whereby said shaft, sleeve and collar are capable of universal movement within said support but rotation of said collar and sleeve with said shaft is prevented.

4. A bearing for shafts and the like comprising a support formed of complemental halves, a ball ground collar disposed between said halves so as to be capable of universal movement therein, a sleeve of bearing metal secured in said collar forming a bearing for the shaft, a reservoir for a lubricant formed in said collar about said sleeve, said sleeve being provided with oil holes communicating with said reservoir, and means including a pin and slot connection for connecting said collar to said support, whereby said shaft, sleeve and collar are capable of universal movement within said support but rotation of said collar and sleeve with said shaft is prevented, there being an oil cup for supplying a lubricant to said reservoir, said oil cup extending through a slot in said support and into said collar.

In testimony whereof I have signed my name to this specification.

BRUCE L. STITZINGER.